United States Patent
Pete et al.

[19]

[11] Patent Number: 5,890,567
[45] Date of Patent: Apr. 6, 1999

[54] BRAKE DRUM MOUNTING

[75] Inventors: Reginal A. Pete, Caledonia; Jeffrey W. Clark, Loves Park, both of Ill.

[73] Assignee: Gunite Corporation, Rockford, Ill.

[21] Appl. No.: 5,462

[22] Filed: Jan. 12, 1998

[51] Int. Cl.⁶ .............................. F16D 65/10; B60B 27/00
[52] U.S. Cl. ................................ 188/218 R; 188/206 R; 301/6.6
[58] Field of Search .............................. 188/18 A, 18 R, 188/206 R, 218 A, 218 R; 301/6.6, 6.7, 105.1

[56] References Cited

U.S. PATENT DOCUMENTS

| | | |
|---|---|---|
| 1,555,137 | 9/1925 | Main et al. . |
| 1,611,664 | 12/1926 | Murray . |
| 2,080,895 | 5/1937 | Nelson . |
| 2,094,637 | 10/1937 | Burger . |
| 3,630,323 | 12/1971 | Hickle . |
| 3,989,305 | 11/1976 | Umeda et al. ........................ 188/218 R |
| 4,456,308 | 6/1984 | Opel et al. . |
| 4,699,433 | 10/1987 | Kopp .......................................... 301/65 |
| 5,328,008 | 7/1994 | Sauo ........................................ 192/17 R |

Primary Examiner—Chris Schwartz
Attorney, Agent, or Firm—Larry L. Saret; Laff, Whitesel, Conte & Saret, Ltd.

[57] ABSTRACT

A brake drum for mounting on a wheel hub has first and second drum pilots for facilitating proper alignment when installing the brake drum on the hub. The first drum pilot is configured to engage a first hub pilot and the second drum pilot is configured to engage a second hub pilot. When the brake drum is initially moved toward the hub during installation, the first drum pilot engages the first hub pilot and the second drum pilot is sufficiently spaced away from the first hub pilot to prevent the front edge of the second drum pilot from being caught on the corner edge of the second hub pilot and the drum becoming eccentrically mounted.

17 Claims, 8 Drawing Sheets

BRAKE DRUM MOUNTING

FIELD OF THE INVENTION

The present invention relates to mounting a brake drum onto a wheel hub. More particularly, the present invention relates to a brake drum having multiple pilot surfaces for guiding and correctly positioning a brake drum on a wheel hub.

BACKGROUND INFORMATION

Proper alignment between a wheel hub and a brake drum is an important consideration when installing the brake drum onto the wheel hub, particularly regarding a heavy vehicle such as a truck. Misalignment causes vibration, shimmy, excessive brake wear, and possible breakage of the drum or hub. Even if the drum is off-center by only 1/16", these problems can occur. Errors in alignment of such a small magnitude are often very difficult to detect when the brake drum is being installed. Thus, means for ensuring proper alignment between the brake drum and wheel hub during installation is needed.

Conventional wheel hubs have hub mounting assemblies which include a wheel bolt for securing a brake drum and wheel onto the hub, a first hub pilot for guiding installation of the wheel onto the hub, and a second hub pilot for guiding installation of the brake drum onto the hub. The first and second hub pilots generally comprise radial guide surfaces confronting the wheel bolt. Typically, the second hub pilot has a larger diameter than the first hub pilot (measured from the center of the wheel hub). The second hub pilot is defined by a corner edge which is set back from the mounting side of the hub such that the first hub pilot sits between the second hub pilot and the mounting side of the hub.

Brake drums have a plurality of drum mounting means which mate with the hub mounting assemblies to hold the brake drum on the hub. A conventional drum mounting means comprises an aperture for receiving the wheel bolt and a drum pilot near the aperture and configured to engage the second hub pilot to guide the brake drum onto the hub. The drum pilot typically comprises a radial surface with a beveled front edge.

When mounting the brake drum onto the hub, it is possible for the beveled front edge of one or more of the drum pilots to catch on one of the corner edges which defines one of the hub pilots. If less than all of the drum pilots are caught, the brake drum is eccentrically mounted relative to the rotational center of the wheel. If all drum pilots are caught, then the drum will be improperly spaced from the hub. Thus, there is a need for an improved drum mounting means for ensuring proper alignment and installation of a brake drum onto a wheel hub.

SUMMARY OF THE INVENTION

These needs and other needs are satisfied by the improved brake drum of the present invention. In accordance with the present invention, the improved brake drum for mounting onto a wheel hub has a mounting assembly, the mounting assembly comprising a first hub pilot, a second hub pilot and a wheel bolt, and also includes: a a drum mounting means, the drum mounting means corresponding to a wheel hub mounting assembly.

The drum mounting means comprises an aperture for receiving the wheel bolt and a stepped engagement surface having first and second drum pilots. The first drum pilot is configured to engage the first hub pilot and the second drum pilot is configured to engage the second hub pilot. In this manner, the first drum pilot guides the brake drum onto the hub in a manner such that the second drum pilot engages the second hub pilot without becoming caught on the corner edge of the second hub pilot.

In one embodiment, the first and second drum pilots each comprise a substantially radial surface having the same axis of symmetry and predetermined diameters. Preferably, the first drum pilot diameter is smaller than the second drum pilot diameter (measured from the center of the wheel hub). Also, the second drum pilot includes a beveled front edge. The first and second drum pilots are defined and separated by a drum pilot edge on the stepped engagement surface.

DETAILED DESCRIPTION OF THE PREFERRED EMBODIMENT

In accordance with the present invention, a brake drum is described that provides distinct advantages when compared to those of the prior art. The invention can best be understood with reference to the accompanying drawing figures.

Figure 1:
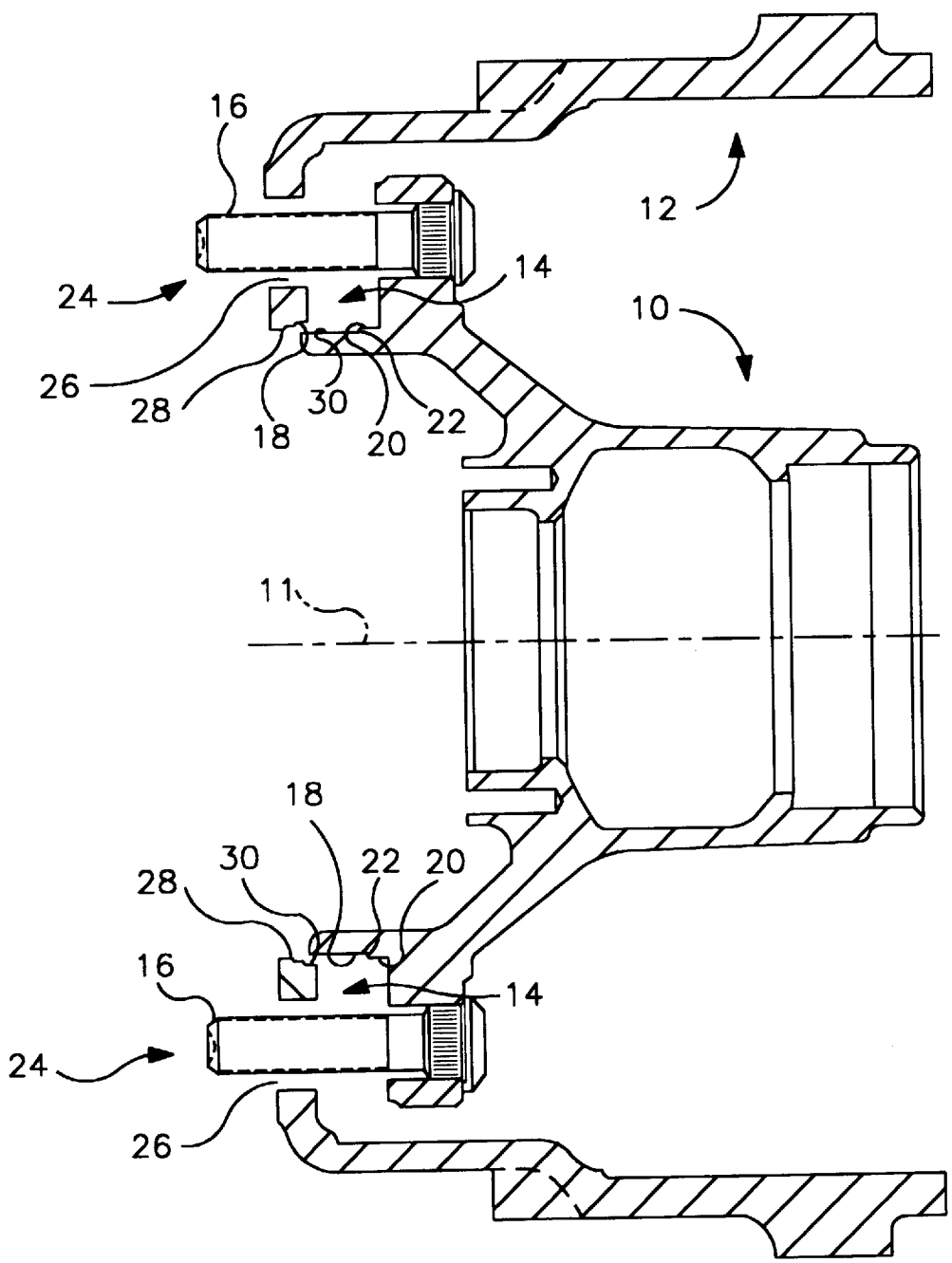
FIG. 1 is a cross-sectional view of a conventional wheel hub and brake drum.
Figure 2:
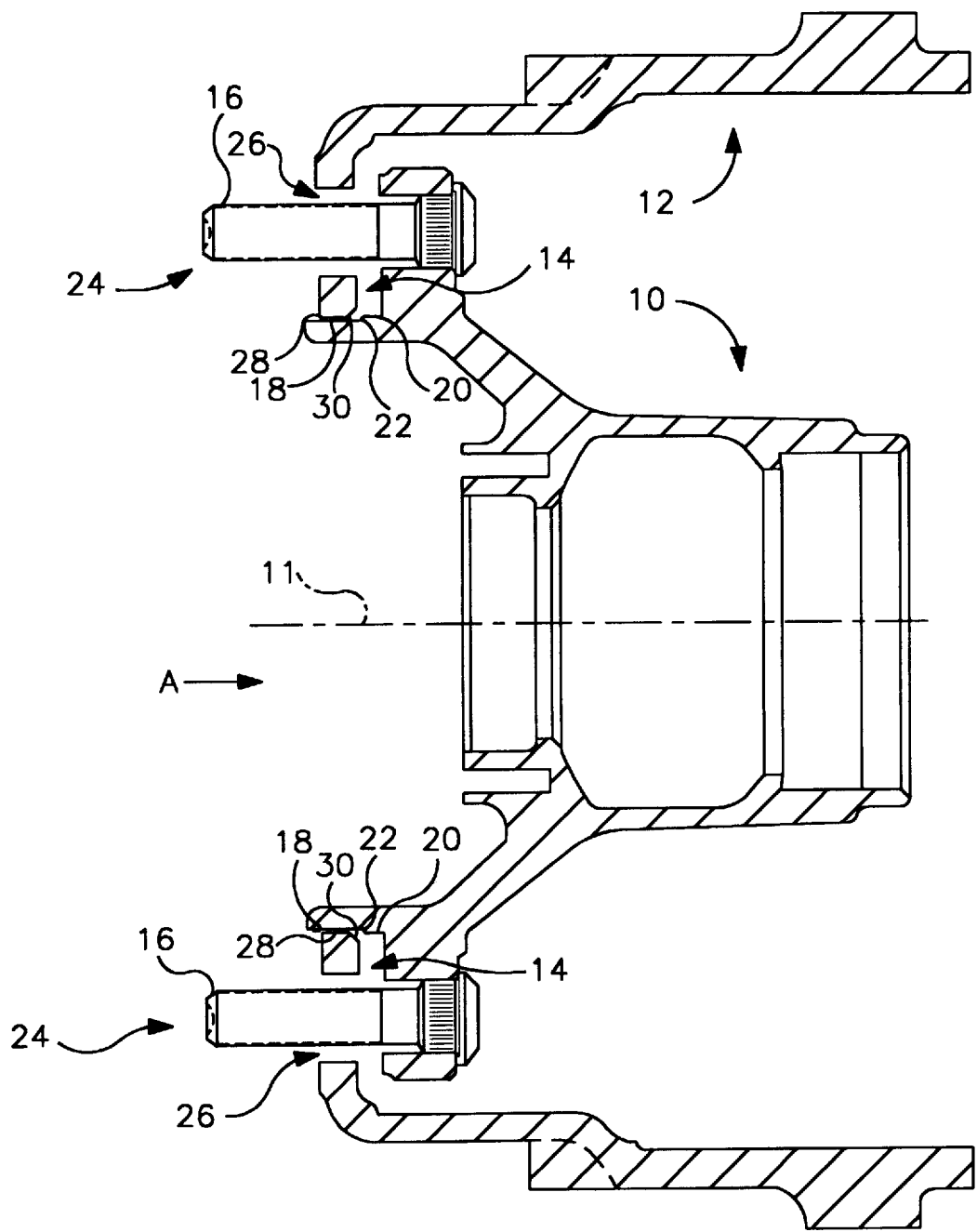
FIG. 2 is a cross-sectional view of the conventional brake drum of FIG. 1 being installed on the conventional wheel hub.
Figure 3:
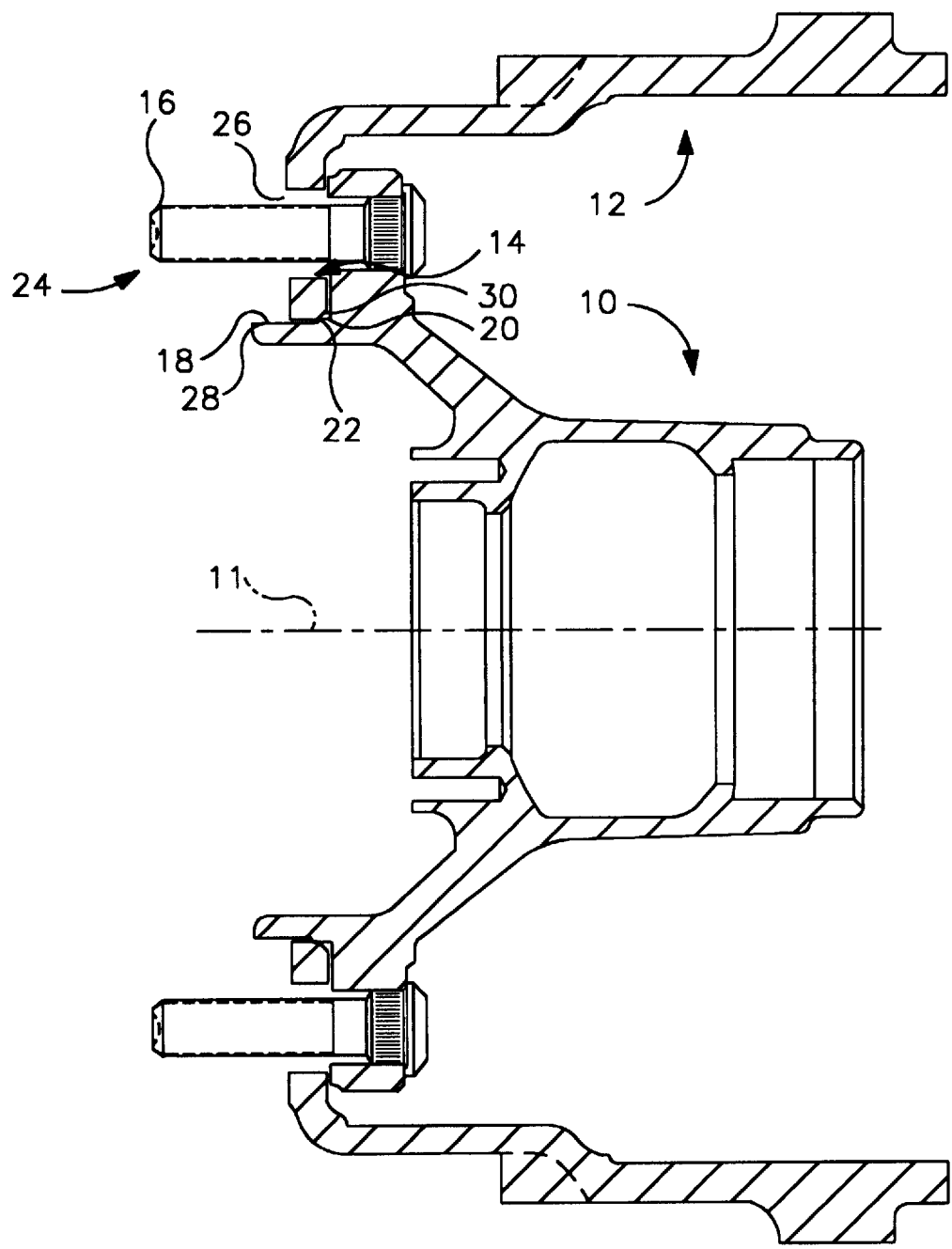
FIG. 3 is a cross-sectional view of the conventional brake drum and hub of FIG. 1 illustrating a misaligned installation of the brake drum.
Figure 5:
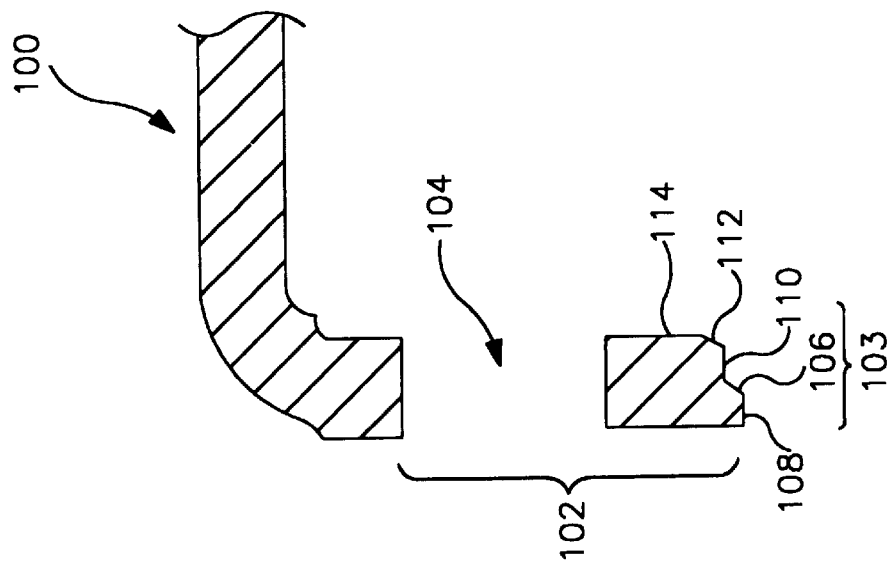
FIG. 5 is an enlarged cross-sectional view of the brake drum of FIG. 4 taken along line 5—5.
Figure 4:
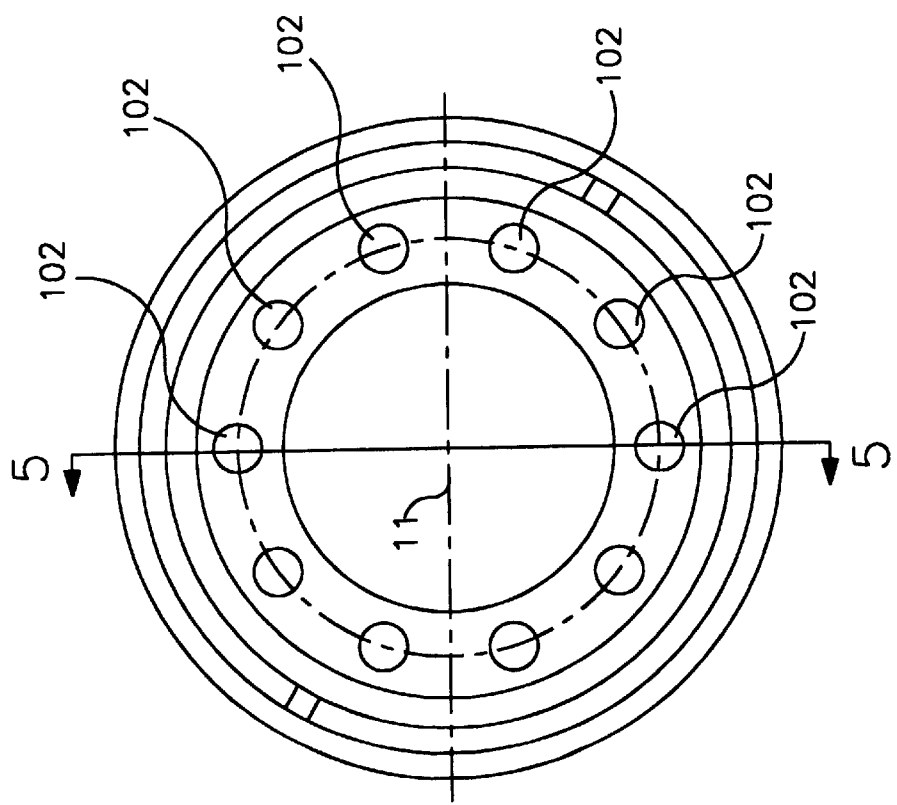
FIG. 4 is a front view of a brake drum according to the present invention.
Figure 6:
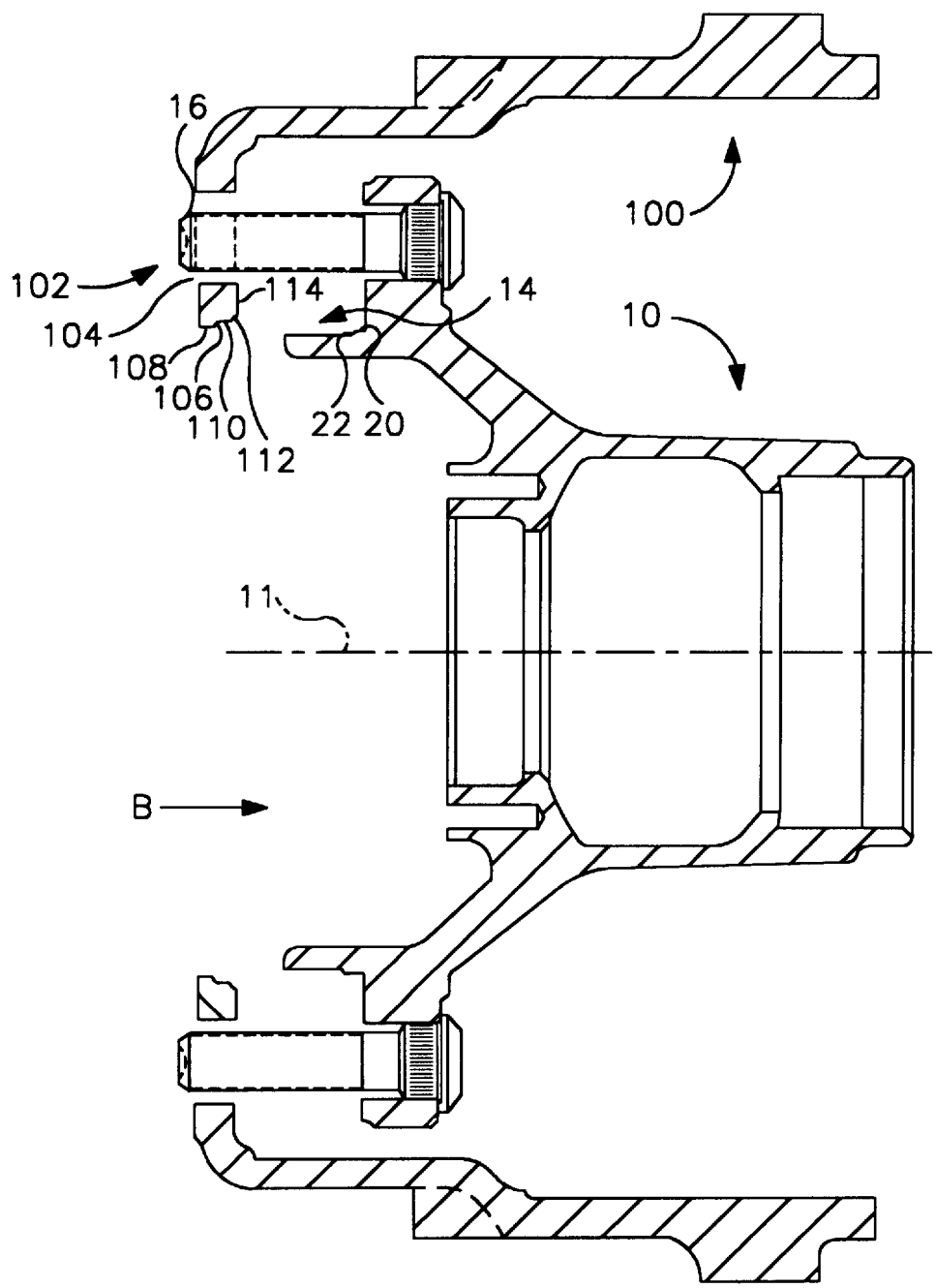
FIG. 6 is a cross-sectional view of a conventional wheel hub and the inventive brake drum of FIG. 4.

Referring now to FIGS. 1–3, a conventional wheel hub 10 and brake drum 12 are shown. The wheel hub 10 includes a hub mounting assembly 14 which comprises a wheel bolt 16, a first hub pilot 18 and a second hub pilot 20. The first hub pilot 18 and second hub pilot 20 generally comprise concentric radial surfaces confronting the wheel bolt 16 and having the same axis of symmetry 11. The second hub pilot 20 has a larger diameter than the first hub pilot 18 (measured from axis 11 which runs along the center of the wheel hub 10) and is defined by a corner edge 22 which is set back from the mounting side of the hub 10 such that the first hub pilot 18 sits between the second hub pilot 20 and the mounting side of the hub 10.

The brake drum 12 includes a drum mounting means 24 configured to mate with the hub mounting assembly 14 to hold the brake drum 12 on the hub 10. The drum mounting means 24 comprises an aperture 26 for receiving a wheel bolt 16 and a drum pilot 28 configured to engage a second hub pilot 20 to guide the brake drum 12 onto the hub 10. The drum pilot 28 comprises a radial surface defined by a beveled front edge 30.

As shown in FIG. 2, the brake drum 12 is mounted on the wheel hub 10 by inserting the wheel bolts 16 through the brake drum apertures 26. It is possible that during installation the drum pilot 28 will engage a first hub pilot 18 instead of the corresponding second hub pilot 20. In this case, as the drum 12 is slid onto the hub 10 in direction A, the beveled front edge 30 of the drum pilot 28 catches on the corner edge 22 (as shown by the upper drum mounting means 24 in FIG. 3). This prevents the drum pilot 28 from properly engaging its corresponding second hub pilot 20. As shown in FIG. 3, this prevents the drum 12 from flush mounting with the hub 10 and causes the drum 12 to be eccentrically mounted relative to the rotational center of the wheel.

A brake drum according to the present invention is shown in FIGS. 4–10 and is generally designated at 100. The brake drum 100 includes a drum mounting means 102 configured to mate with corresponding hub mounting assembly 14 on a conventional hub 10 of the kind shown and described with reference to FIGS. 1–3. Reference numerals identical to those used in FIGS. 1–3 will be used for the hub and associated hub parts depicted in FIGS. 6–10.

The drum mounting means 102 comprises an aperture 104 for receiving a wheel bolt 16, and a stepped engagement surface 103 having first and second drum pilots 108 and 110 and a drum pilot edge 106 defining and separating the drum pilots 108 and 110. The first drum pilot 108 is a substantially radial surface configured for engaging the first hub pilot 18, and the second drum pilot 110 is also a substantially radial surface having the same axis of symmetry 11 as that of the first drum pilot 108 and configured for engaging the second hub pilot 20. Edge 106 is of a predetermined height normal to the drum pilot axis of symmetry 11 and angled to both drum pilots 108 and 110, giving the stepped engagement surface 103 its stepped appearance. Edge 106 is of sufficient height to insure that the second drum pilot 110 passes over the corner edge 22 during installation, as described subsequently. The second drum pilot 110 lies closer to aperture 104 and wheel bolt 16 than the first drum pilot 108.

Figure 9:
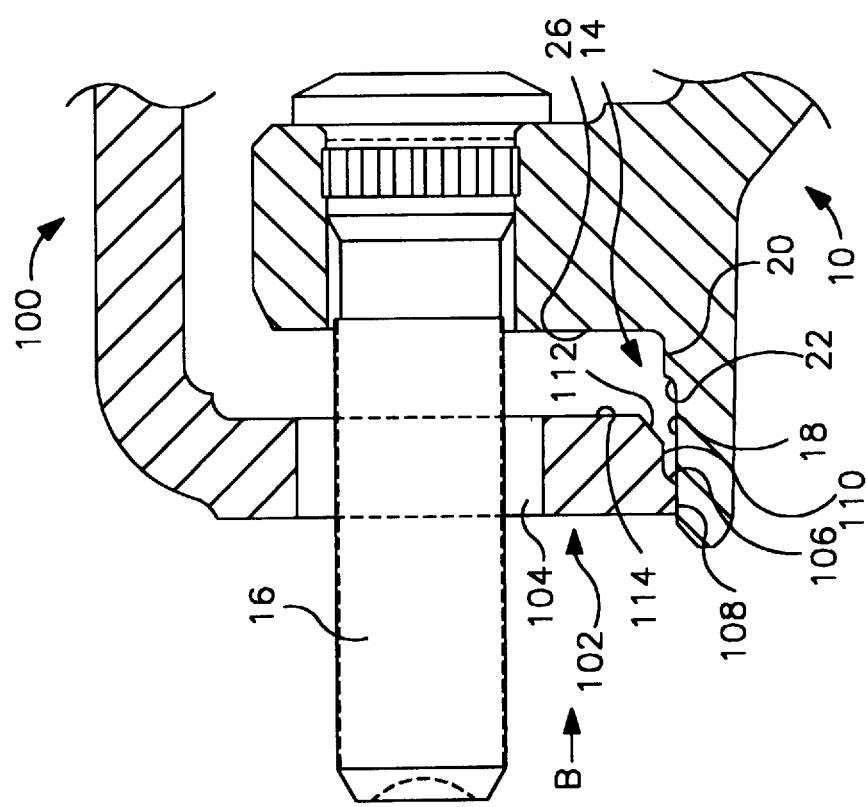
FIG. 9 is an enlarged cross-sectional view of the drum pilot surfaces of the inventive brake drum of FIG. 4 as the brake drum is being installed on the conventional hub.

The drum mounting means 102 has a back surface 114 which is configured to abut the front surface 26 of the hub 10 (FIG. 9). Preferably, the drum mounting means 102 further includes a beveled back edge 112 which is a surface angled obtusely relative to the second drum pilot 110 and which connects the second drum pilot 110 to the drum back surface 114. The beveled back edge 112 guides the second drum pilot 110 so as to abut the corresponding second hub pilot 20 as the drum 100 is installed onto the hub 10.

The first and second drum pilots 108 and 110 comprise substantially radial surfaces having predetermined diameters corresponding to the diameters of the first and second hub pilots 18 and 20, respectively. The diameter of the first drum pilot 108 is smaller than the diameter of the second drum pilot 110 (measured from axis 11 which runs along the center of wheel hub 10) so that the first drum pilot 108 can engage the first hub pilot 18 while the second drum pilot 110 engages the second hub pilot 20.

Figure 7:
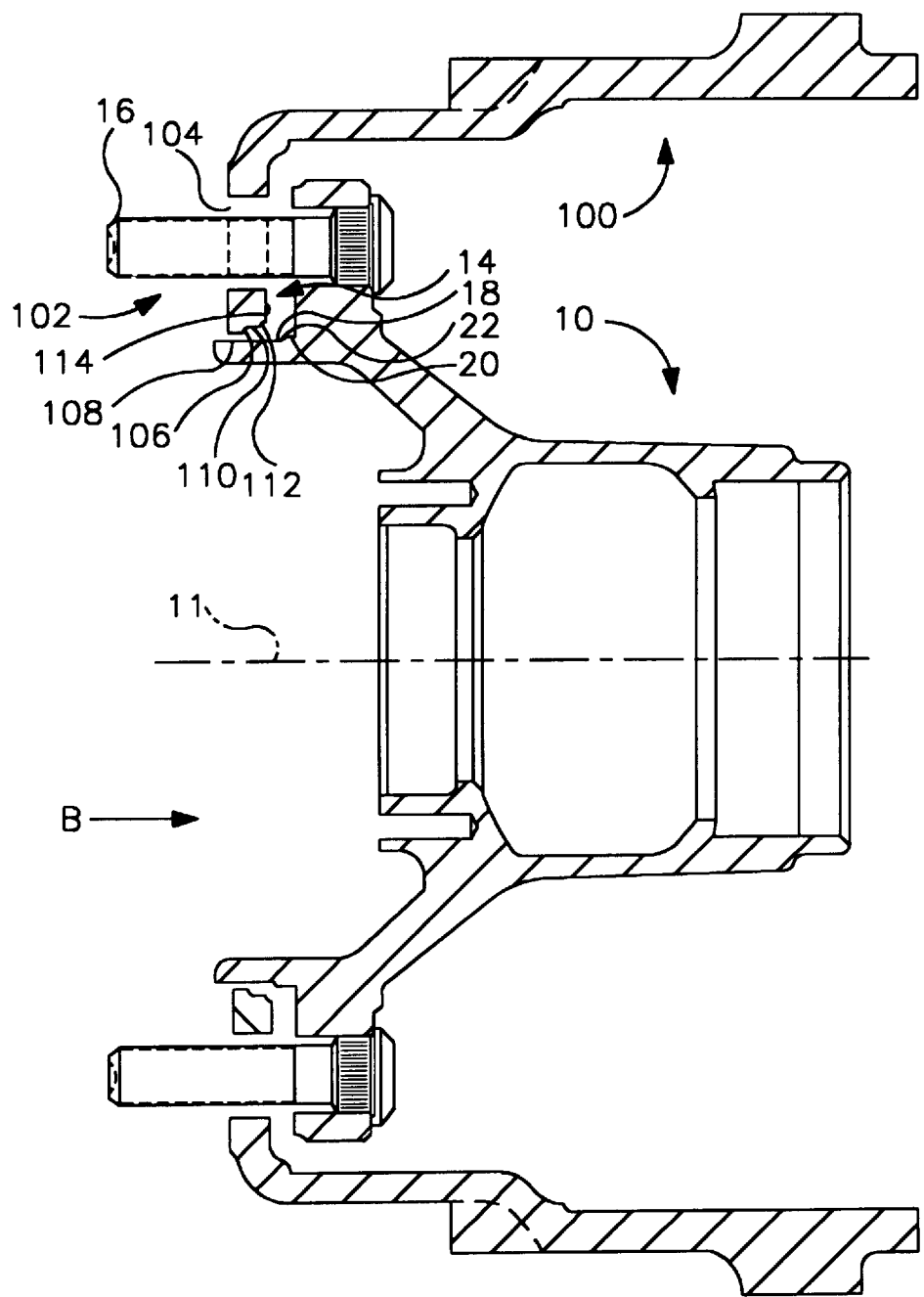
FIG. 7 is a cross-sectional view of the inventive brake drum of FIG. 4 being installed on a conventional wheel hub.
Figure 8:
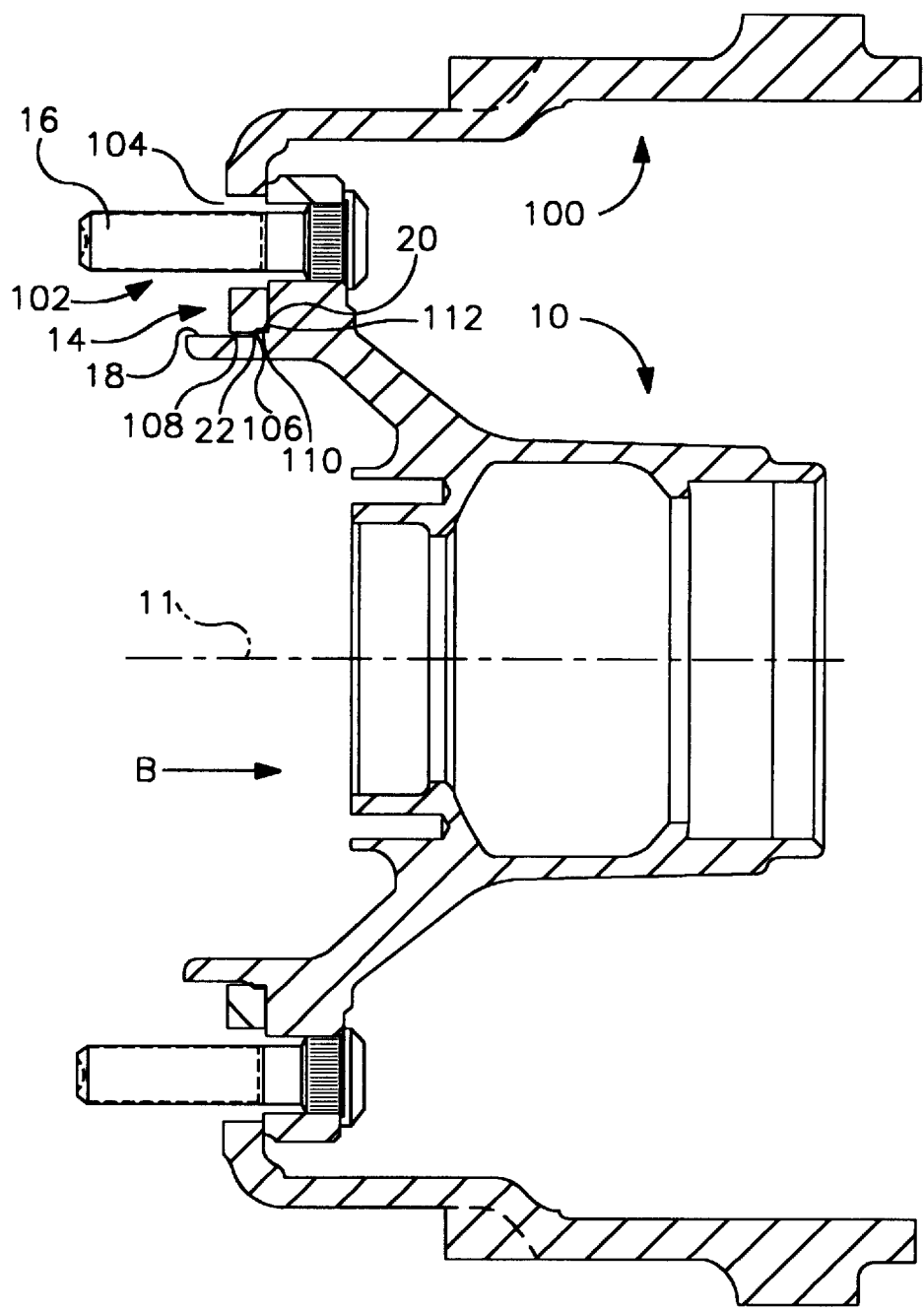
FIG. 8 is a cross-sectional view of the inventive brake drum of FIG. 4 properly installed on a conventional wheel hub.
Figure 10:
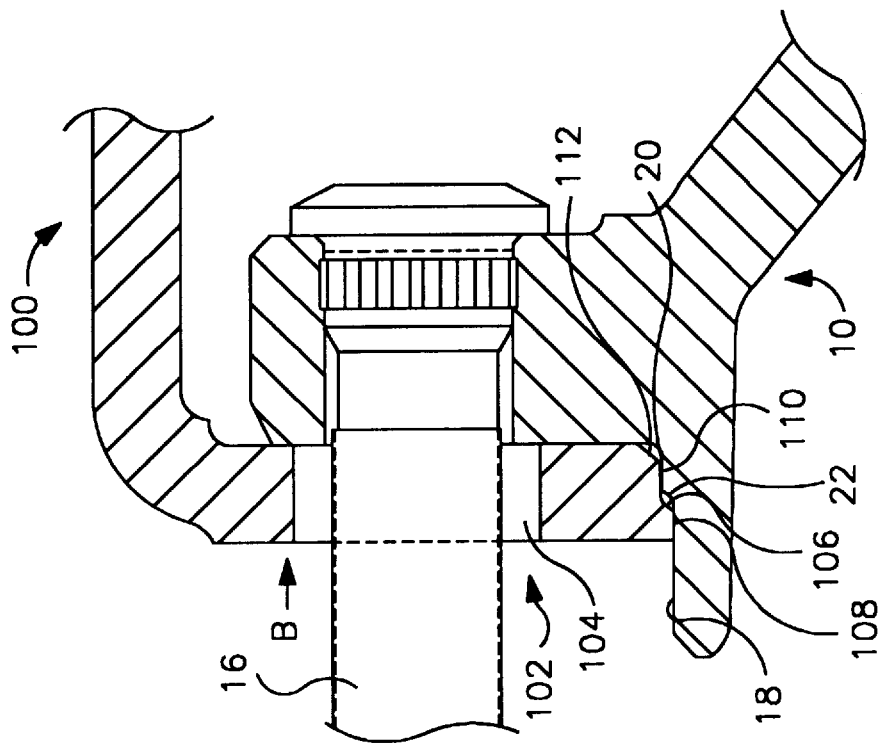
FIG. 10 is an enlarged cross-sectional view of the drum pilot surfaces of the inventive brake drum of FIG. 4 with the brake drum properly aligned and installed on the conventional hub.

As shown in FIGS. 6–10, the brake drum 100 is mounted on the hub 10 by inserting the wheel bolts 16 through the brake drum apertures 102 and sliding the drum 100 toward the hub 10 in direction B. When the drum 100 is initially moved toward the hub 10, the first drum pilot 108 engages the first hub pilot 18 with the second drum pilot 110 spaced away from the first hub pilot 18 (as shown in FIG. 7). As the drum 100 is moved closer to the hub 10 in direction B, the second drum pilot 110 clears the corner edge 22 and slides over and against the second hub pilot 20. Since the beveled back edge 112 of the drum mounting means 102 is angled relative to corner edge 22, the beveled back edge 112 assists in preventing the drum 100 from becoming caught on the corner edge 22.

It will be apparent to those skilled in the art that modifications may be made without departing from the spirit and scope of the invention. Accordingly, it is not intended that the invention be limited except as may be necessary in view of the appended claims.

What is claimed is:

1. A wheel drum for mounting onto a wheel hub having a hub mounting assembly, said hub mounting assembly comprising a first hub pilot, a second hub pilot and a wheel bolt, the wheel drum comprising:

a drum mounting means, said drum mounting means corresponding to said hub mounting assembly, said drum mounting means including an aperture for receiving said wheel bolt, and first and second drum pilots, said first drum pilot for engaging said first hub pilot and said second drum pilot for engaging said second hub pilot, said first and second drum pilots together comprising a stepped engagement surface.

2. The brake drum of claim 1 wherein said first and second drum pilots each comprise a substantially radial surface having a predetermined diameter.

3. The brake drum of claim 2 wherein said first drum pilot diameter is smaller than said second drum pilot diameter.

4. The brake drum of claim 1 wherein said drum mounting means includes a beveled back edge.

5. The wheel drum of claim 1 wherein said first and second drum pilots are substantially radial surfaces aligned coaxially around an axis of symmetry and separated by a drum pilot edge normal to said axis of symmetry.

6. A wheel drum mounting means for mounting a wheel drum onto a wheel hub having a hub mounting assembly, said hub mounting assembly including a wheel bolt and a hub engagement surface having a corner edge of predetermined height defining a first hub pilot and a second hub pilot, the drum mounting means comprising:

an aperture for receiving said wheel bolt;

a first drum pilot for engaging the first hub pilot; and a second drum pilot for engaging the second hub pilot;

wherein said first and second drum pilots together comprise a stepped engagement surface such that said second drum pilot is adapted to engage the second hub pilot without becoming caught on the corner edge.

7. The drum mounting means of claim 6 wherein said first and second drum pilots each comprise a substantially radial surface having a predetermined diameter.

8. The drum mounting means of claim 7 wherein said first drum pilot diameter is smaller than said second drum pilot diameter.

9. The drum mounting means of claim 6 wherein said first and second drum pilots are substantially radial surfaces having a common axis of symmetry and separated by a drum pilot edge at a predefined height normal to said axis of symmetry.

10. The drum mounting means of the claim 9 wherein said drum pilot edge height is larger than the corner edge height to insure that said second drum pilot is adapted to pass over the corner edge of the hub engagement surface upon mounting of the wheel drum onto the wheel hub.

11. The drum mounting means of claim 6 wherein said drum mounting means further comprises a beveled back edge.

12. The drum mounting means of claim 11 wherein said beveled back edge comprises a planar surface angled obtusely relative to said second drum pilot.

13. A brake drum for mounting onto a wheel hub, wherein the wheel hub includes a first radial hub surface and a second radial hub surface concentric with said first radial hub surface, and wherein the brake drum comprises:

first and second drum pilots on said brake drum, each of said drum pilots constituting radial surfaces concentric with and adapted to engage said first and second radial hub surfaces.

14. The brake drum of claim 13 and a drum edge between said first and second drum pilots and inclined relative thereto.

15. The brake drum of claim 14 and a corner edge between said first and second radial hub surfaces and inclined relative thereto, and wherein said drum edge is of sufficient height to permit the second drum pilot to pass over said corner edge during mounting of said drum onto said hub.

16. The brake drum of claim 13 wherein said brake drum further comprises a drum back surface and a beveled surface between said second drum pilot and said drum back surface.

17. The brake drum of claim 13 wherein the diameters of the first radial hub surface and first drum pilot are the same, and the diameters of the second radial hub surface and second drum pilot are the same.

* * * * *

UNITED STATES PATENT AND TRADEMARK OFFICE
CERTIFICATE OF CORRECTION

PATENT NO. : 5,890,567
DATED : April 6, 1999
INVENTOR(S) : Reginal A. Pete, et al.

It is certified that error appears in the above-identified patent and that said Letters Patent is hereby corrected as shown below:

Column 4 Line 16    delete "wheel" (1st. occ.) and insert --brake--.

Column 4 Line 19    delete "wheel" and insert --brake--

Column 4 Line 35    delete "wheel" and insert --brake--

Column 4 Line 39    delete first occurence of "wheel" and insert --brake--

Column 4 Line 67    delete first occurence of "wheel" and insert --brake--

Signed and Sealed this

Seventh Day of September, 1999

Q. TODD DICKINSON

Attest:

Attesting Officer

Acting Commissioner of Patents and Trademarks

UNITED STATES PATENT AND TRADEMARK OFFICE
CERTIFICATE OF CORRECTION

PATENT NO : 5,890,567
DATED : April 6, 1999
INVENTOR(S): Pete et al.

It is certified that error appears in the above-identified patent and that said Letters Patent is hereby corrected as shown below:

Drawing:
Please amend Fig. 1 in drawing sheet number 1 as follows: in the upper segment of Fig. 1 please delete the number "18" and insert the number —30—, and delete the number "30" and insert the number —18—

Signed and Sealed this

Fifth Day of December, 2000

Q. TODD DICKINSON

*Attest:*

*Attesting Officer*    *Director of Patents and Trademarks*